United States Patent [19]

Lee

[11] Patent Number: 5,474,025
[45] Date of Patent: Dec. 12, 1995

[54] ANIMAL FURNITURE

[75] Inventor: Ivy Y. C. Lee, Kowloon, Hong Kong

[73] Assignee: Alliance Pet Supply Company Limited, Hong Kong

[21] Appl. No.: 322,577

[22] Filed: Oct. 13, 1994

[51] Int. Cl.⁶ ............................ A01K 31/12; A01K 39/00
[52] U.S. Cl. .............................. 119/26; 119/61; 446/126; 482/35
[58] Field of Search .................... 119/25, 26, 18, 119/24, 74, 61, 51.01, 72, 702, 707; 482/35, 36, 37; 446/126, 120, 121

[56] References Cited

U.S. PATENT DOCUMENTS

| Re. 33,785 | 12/1991 | Hildebrandt | 446/126 X |
|---|---|---|---|
| 1,488,244 | 3/1924 | Hinton | 482/36 |
| 2,052,457 | 8/1936 | French | 446/120 X |
| 3,360,883 | 1/1968 | Glanzer | 446/126 X |
| 3,452,989 | 7/1969 | Jernstrom | 446/120 X |
| 5,318,470 | 6/1994 | Denny | 446/126 |

FOREIGN PATENT DOCUMENTS 1332044  6/1963  France ...................... 446/126

OTHER PUBLICATIONS

Pre-School Review, Toys International & the Retailer Jun., 1984 (London) p. 24.

Primary Examiner—Thomas Price
Attorney, Agent, or Firm—Samuels, Gauthier & Stevens

[57] ABSTRACT

Bird cage furniture comprises a number of interconnecting parts including ladder sections 10 and 11, apertured nodal bodies 12, 14, 16, 17, 18 and 19, linking members 20, feet 22, 23, 24 and 25, and a feeding trough 26. The parts are readily assembled into the configuration shown, or other configurations, by entering and gripping ends of the ladder sections, the linking members and tops of the feet into different apertures in the bodies 12 to 19. The feet 22 and 23 have their bases gripped between adjacent wires of a wire mesh wall of a cage. The furniture can be readily disassembled for removing its parts from the cage, for cleaning and so on.

8 Claims, 3 Drawing Sheets

ANIMAL FURNITURE

BACKGROUND OF THE INVENTION

1. Field of the Invention

The invention relates to animal furniture.

2. Description of Prior Art

The invention relates more particularly to furniture, especially suitable for birds, that can readily assembled and disassembled into different configurations. It is already known to provide ladders and feeding troughs which fit inside a cage and are supported by interlocking members which hold or support them to wire mesh sides of the cage. Hitherto such ladders and troughs, which may also clip directly to the ladder for support, are provided with limited interlocking cooperation possibilities so that choice of possible configurations within the cage is also limited.

SUMMARY OF THE INVENTION

It is an object of the invention to overcome this problem.

According to the invention there is provided animal furniture for a wire mesh animal cage comprising a number of interconnecting parts, including ladder sections each having sides which extend at either end beyond rungs of the ladder sections, a plurality of nodal bodies formed with apertures disposed to receive the sides of the ladder sections, rigid link members which fit into apertures of the nodal bodies to hold the nodal bodies together, and feet which connect to the nodal bodies, in which the interconnecting parts are arranged to be readily and differently assembled to form chosen configurations for use in the cage.

The nodal bodies may be solid and spherical and provided with at least six evenly distributed apertures in their surfaces.

The feet may be formed with an aperture at one end to receive one of the rigid link members.

Each foot may be formed at its base with a groove which fits snugly between adjacent wires of the wire mesh cage to hold the foot relatively in position between and along the wires.

One of the interconnecting parts may comprise a feeding trough provided with one or more linking members which fit and are held in apertures in one or more of the nodal bodies respectively.

The interconnecting parts are preferably all formed of plastics material.

BRIEF DESCRIPTION OF THE DRAWINGS

Bird cage furniture according to the invention will now be described by way of example with reference to the accompanying drawings in which.

DESCRIPTION OF PREFERRED EMBODIMENTS

Figure 1:
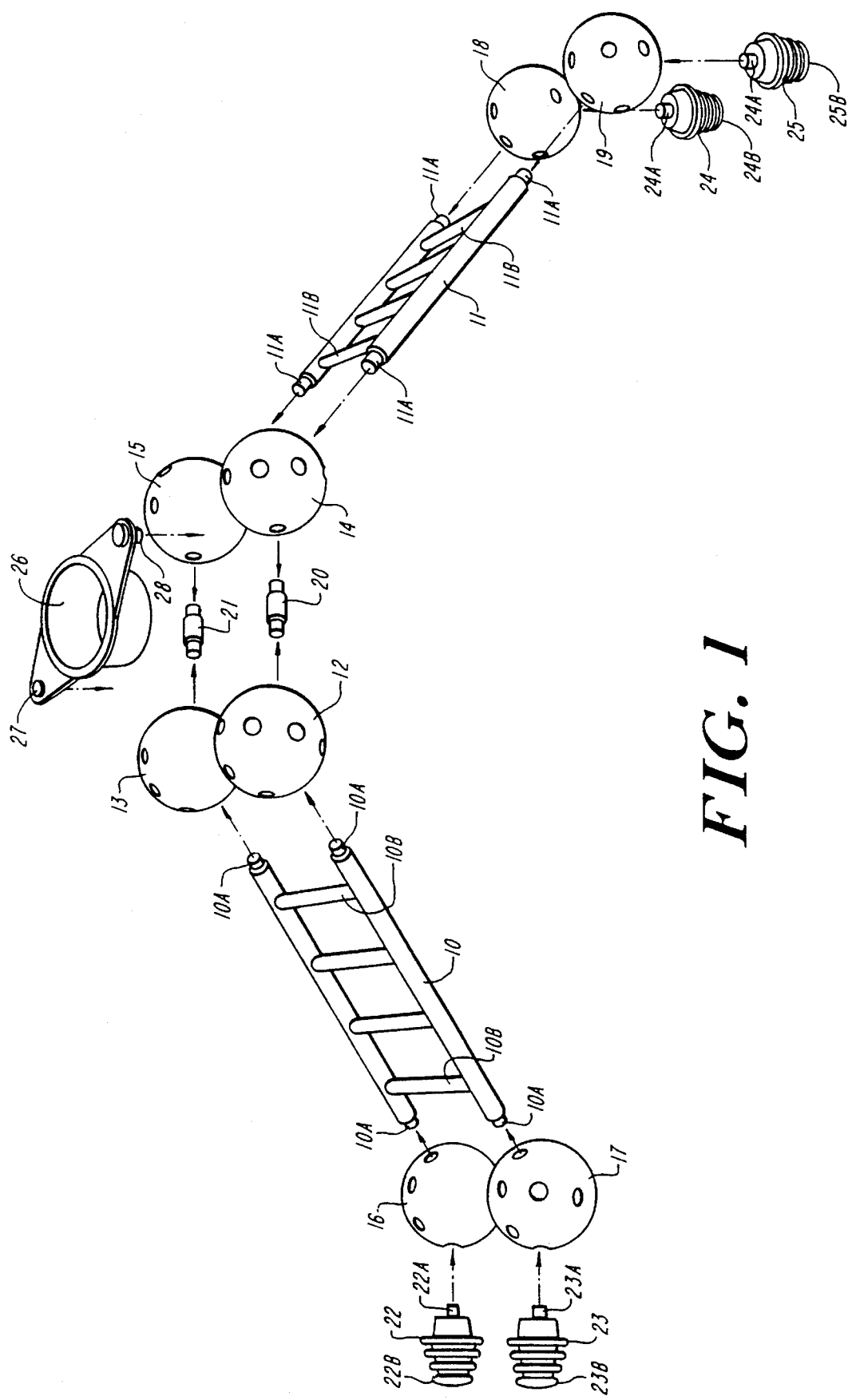
FIG. 1 shows an exploded isometric view of the furniture.

Referring to the drawings, in FIG. 1 the furniture comprises a number of different interconnecting parts including two ladder sections 10 and 11 each having sides 10A and 11A extending at either end beyond rungs 10B and 11B. Spherical nodal bodies 12, 13, 14, 15, 16, 17, 18 and 19 are each provided in their surfaces with a number of apertures disposed for receiving ends 10A and 11A, as well as link members such as 20 and 21.

Figure 2:
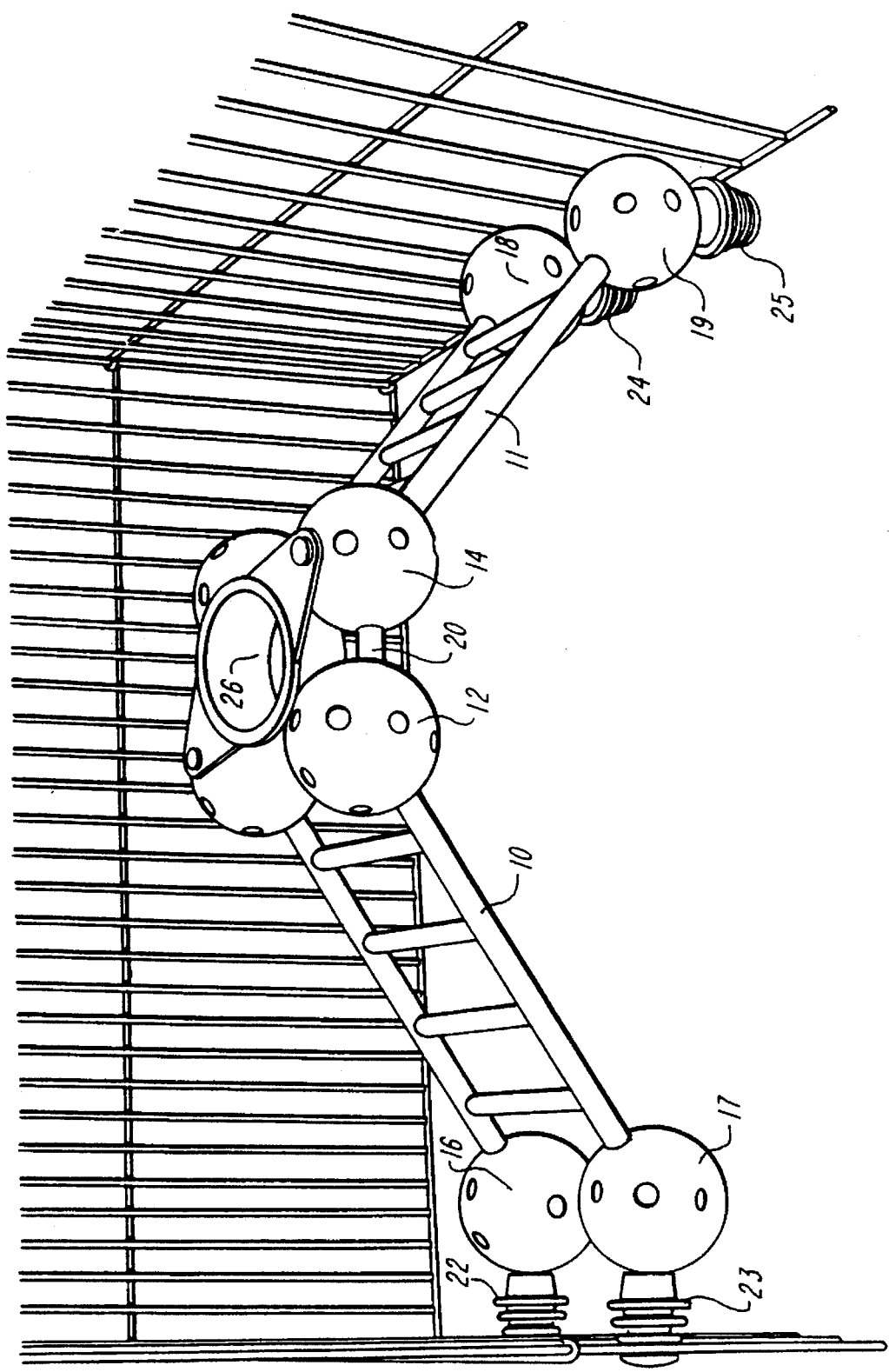
FIG. 2 shows an isometric view of the furniture in one assembled configuration.
Figure 3:
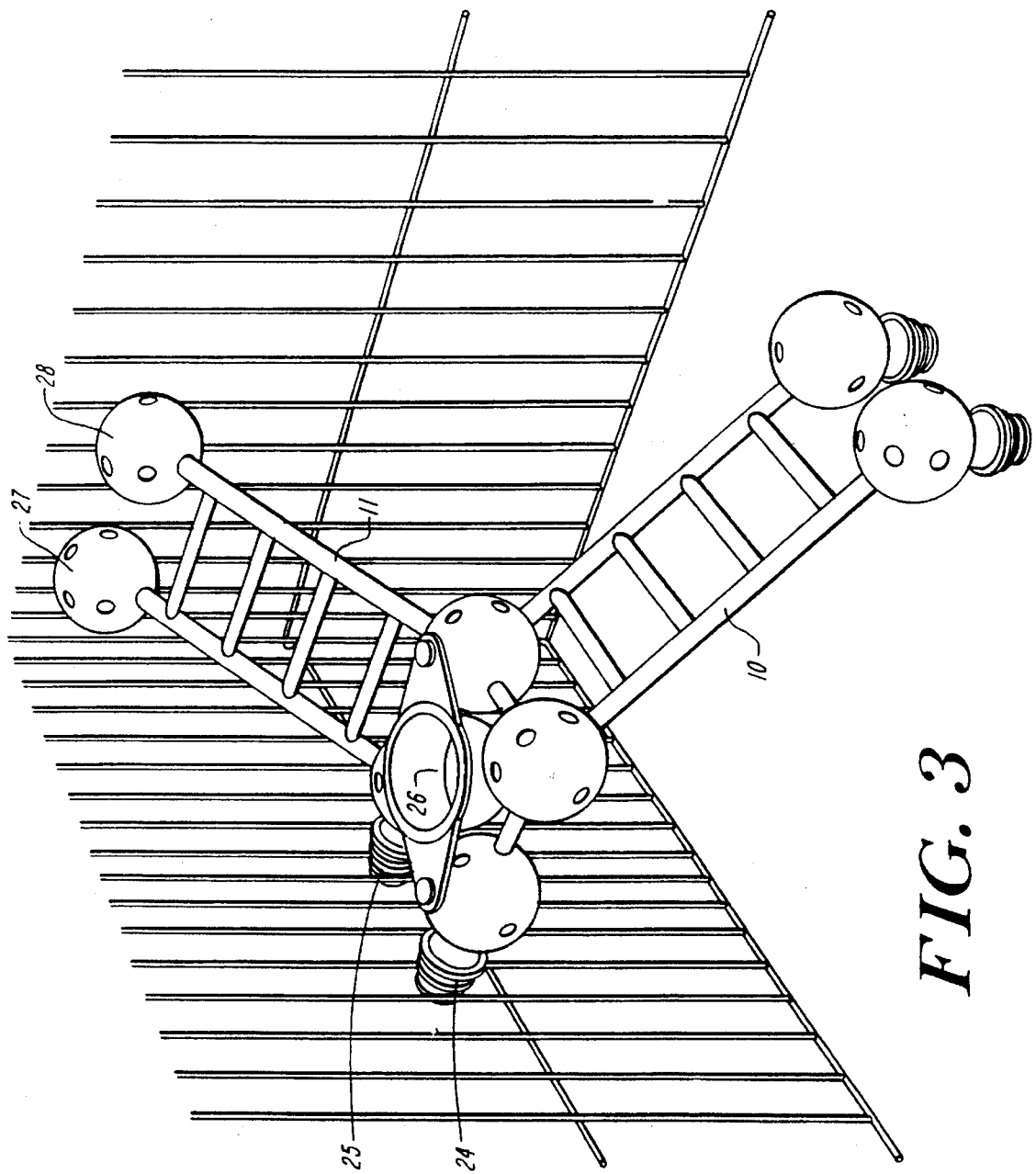
FIG. 3 shows an isometric view of the furniture in another configuration.

Four feet 22, 23, 24 and 25 are provided each with a linking member 22A, 23A, 24A and 25A respectively. The linking members 22A to 25A may be integrally formed with the feet or separately formed as preferred. In the latter case, each foot is provided with an aperture to receive a linking member. Bases 22B to 25B of each respective foot are each provided with a peripheral groove which fits snugly between adjacent wires of a wire mesh cage wall, as shown in FIGS. 2 and 3. Normally, the material forming the feet is sufficiently flexible and resilient to allow the base of each foot to slide between the adjacent wires and then to grip the wires to hold the foot in a chosen position along the wires on the wall of the cage.

A feeding trough 26 has two wings, extending beyond a central bowl, which are provided with linking members 27 and 28 which respectively enter apertures in the nodal bodies 13 and 14.

The interconnecting parts are formed at least predominantly of plastics material and arranged to be readily assembled and disassembled as required. The ends of the ladders and the link or linking members are slidable interference fits in the apertures of the nodal bodies. This allows the parts to be removed from inside the cage either in individual parts or at least partially disassembled from one another and washed and cleaned from time to time. Also, the interconnecting parts can be put together to provide various configurations not only to suit different cages, or different orientations of the cage in its normal hanging space for example, but also to change or vary the configuration from time to time to suit different birds or make the furniture by its changes more stimulating for the same bird. Also, the same furniture can be readily adapted for use by other animals such as mice, gerbils and the like. The bodies 12 to 19 can be solid bodies or hollow bodies as desired.

In FIG. 2, the furniture is arranged with the ladder sections 10 and 11 opposing one another and the feeding trough 26 centrally mounted adjacent the top of each ladder section 10 and 11. It will be noted that the feet 22 and 23 are held respectively by adjacent wires of one side of the cage (the cage is only partially illustrated) whereas the feet 24 and 25 are supported on a base of the cage.

In FIG. 3, the ladder sections 10 and 11 are positioned with their longitudinal axes at right angles to one another and the trough 26 is mounted between the ladder sections at a mid-way point up the combined ladder so formed. The feet 22 and 23 rest on the base of the cage and the feet 24 and 25 are held in position by a side of the cage behind the trough 26. At the top of the ladder further nodal bodies 27 and 28 simply rest against another side of the cage. If desired one or both the nodal bodies 27 and 28 can be provided with feet (not shown) which grip the other side of the cage.

The described furniture may be used outside a cage by birds or other animals that are tame and do not need to be restricted always in a surrounding cage, for example. Also, the nodal bodies may be cubic or shaped like pyramids and so on.

I claim:

1. Animal furniture for a wire mesh animal cage comprising a plurality of interconnecting parts, including ladder sections each having sides which extend beyond rungs of the ladder sections, a plurality of nodal bodies each of which includes a plurality of apertures, at least one of said apertures being adapted to receive a portion of one of the sides of the ladder sections, rigid link members which fit into other of said apertures of the nodal bodies to hold the nodal bodies together, and feet which connect to the nodal bodies, in which the interconnecting parts are arranged to be readily and differently assembled to form chosen configurations for use in the cage.

2. Animal furniture according to claim 1, in which the nodal bodies are solid and spherical and provided with at least six evenly distributed apertures in their surfaces.

3. Animal furniture according to claim 1, in which each foot is formed at its base with a groove which is adapted to fit snugly between adjacent wires of a wire mesh cage.

4. Animal furniture according to claim 1, in which one of the interconnecting parts comprises a feeding trough provided with at least one linking member which fits into and is held in an aperture in at least one of the nodal bodies respectively.

5. Animal furniture according to claim 1, in which the interconnecting parts are all formed of plastics material.

6. Apparatus for use within a mesh animal cage, said apparatus comprising:

a plurality of anchor elements each including cage engagement means for releasably attaching said anchor elements to the mesh cage;

a plurality of nodal bodies each including attachment means for releasably attaching said nodal body to an anchor element in one of a plurality of possible respective orientations; and a plurality of elongated members each including nodal body attachment means on at least one end thereof for releasably attaching said elongated member to said attachment means of a nodal body in one of a plurality of possible respective orientations.

7. An apparatus as claimed in claim 6, wherein said cage engagement means of said anchor elements include conically shaped portions having circular grooves therein for releasably receiving the mesh of said cage.

8. An apparatus as claimed in claim 7, wherein each said cage engagement means includes a plurality of circular grooves spaced apart from one another along the length of said conically shaped portions, and wherein the depth of said grooves substantially follows the outer surface of said conically shaped portion.

* * * * *